US008890356B2

(12) United States Patent
Fang

(10) Patent No.: US 8,890,356 B2
(45) Date of Patent: Nov. 18, 2014

(54) POWER CONVERSION INSTALLMENT KIT FOR PLUG-IN HYBRID ELECTRIC VEHICLE

(75) Inventor: Jianhua Fang, Shanghai (CN)

(73) Assignee: Shanghai ACREL Power Management Co., Ltd., Shanghai (CN)

( * ) Notice: Subject to any disclaimer, the term of this patent is extended or adjusted under 35 U.S.C. 154(b) by 775 days.

(21) Appl. No.: 13/111,691

(22) Filed: May 19, 2011

(65) Prior Publication Data

US 2011/0304203 A1 Dec. 15, 2011

(51) Int. Cl.
B60L 11/00 (2006.01)
B60L 11/18 (2006.01)

(52) U.S. Cl.
CPC .............. B60L 11/1805 (2013.01); Y02T 10/92 (2013.01); Y02T 10/6269 (2013.01); Y02T 10/7005 (2013.01)
USPC ........................................................ 307/10.1

(58) Field of Classification Search
None
See application file for complete search history.

(56) References Cited

U.S. PATENT DOCUMENTS 6,515,446 B1 * 2/2003 Koide et al. .................... 318/700
6,630,810 B2 * 10/2003 Takemasa et al. ............. 320/104
2010/0253139 A1 * 10/2010 King ............................... 307/9.1

FOREIGN PATENT DOCUMENTS

CN 2102859 U * 4/1992

* cited by examiner

Primary Examiner — Hal Kaplan
Assistant Examiner — David Shiao

(57) ABSTRACT

A power conversion system for HEV, which comprising: a battery pack and inverter power conversion module for generating DC voltage; the inverter power conversion module is used to convert DC voltage into DC high voltage required for driving the motor of HEV; while the power conversion effect is guaranteed, the present invention could reduce markedly the amount of batteries for the battery pack, minimize the cost and weight, while the connections of batteries and possible unreliable factors are cut down for more reliable connection and simpler processing.

9 Claims, 1 Drawing Sheet

POWER CONVERSION INSTALLMENT KIT FOR PLUG-IN HYBRID ELECTRIC VEHICLE

BACKGROUND OF INVENTION

1. Field of the Invention

The present invention relates generally to a power conversion system, and more particularly to an innovative one which is applied to hybrid electric vehicle (HEV).

2. Description of Related Art

Owing to the restrictions of traffic lights and traffic jam, about 30% energy of the electric engines is converted to heat and drained into the environment in case of braking; however, storage of wasted energy is critical with the growing energy cost and demanding calls for environmental protection; HEV allows to recycle the braking energy by an additional energy storage system, and drive the internal combustion engine when climbing or acceleration.

HEV (Hybrid Electric Vehicle) is operated by driving the wheels with its engine and electric motor. Generally, the vehicle is equipped with driving batteries as the power conversion of electric motor, and the driving batteries are recharged by the generator, which is driven by the engine, or used as braking regenerator driven by inertia during braking. The advantages of HEV lie in that, when the vehicle is started or stopped, the motor is not activated under the driving of generator, if a certain speed is not reached. Thus, the motor is always kept in optimum working conditions with good dynamic property and lower emissions, and used as the source of electric energy. It can be operated only by refueling.

For the power conversion required for HEVs, the currently available LFP batteries are implemented in series to meet the voltage required for HEVs; yet there are three common problems: one: LFP batteries have a very high cost, e.g.: over 100 batteries are required for existing 320V system; two: recharging time of LFP batteries is very long; three: complex assembly and numerous connections cause the hazards of risk, poor reliability and difficulty in quality control.

As a whole, it is very necessary to improve existing technologies to address the aforementioned problems of prior art, such as: extremely huge amount of batteries, longer recharging time, complex assembly and hazards of risk caused by numerous connections.

SUMMARY OF THE INVENTION

The primary objective of the present invention is to provide a power conversion installment kit for plug-in HEVs, which could reduce the amount of batteries with the inversion principle to guarantee power conversion effect, reduce the cost and recharging time and improve the production quality in a streamlined process.

A power conversion system of HEV of the present invention comprises:

a battery pack, used to generate DC voltage;

an inverter power conversion module, with its input end linked to the battery pack, and output end linked to DC motor of HEV, used to convert: DC voltage into DC high voltage; the required DC high voltage shall be capable of at least driving DC motor.

The inverter power conversion module including at least:

a voltage-regulating module, connected with the anode of the battery pack, and used to regulate DC voltage for providing a stable DC low voltage;

a high-frequency oscillating circuit, with one end linked to the voltage-regulating module, and powered by DC low voltage to output high-frequency small signals, and the other end linked to high-frequency power amplifier circuit;

a high-frequency power amplifier circuit, used to receive and amplify the high-frequency small signal, and generate high-power high-frequency signal;

a high-frequency transformer, used to receive high-power high-frequency signal and boost to a high voltage; and a rectifier circuit, bridged onto the secondary end of the high-frequency transformer, with its output end linked to DC motor of HEY; the rectifier circuit rectifies the high voltage and then outputs the required DC high voltage to drive the DC motor.

The rectifier circuit is a bridged rectifier circuit composed of four rectifier diodes.

The inverter power conversion module also including at least:

a reference generator circuit, with one end linked to the voltage-regulating module, and the other end linked to the cathode of the battery pack, helping to provide the reference voltage for the decision circuit module;

a sampling decision circuit, comprising of a first sampling circuit, a second sampling circuit and decision circuit module; the first sampling circuit is connected between the anode and cathode of the battery pack, allowing for sampling of the output voltage of the battery pack to acquire the first sampling value; and, the first sampling value is sent to the decision circuit module; the second sampling circuit is linked to the output end of the rectifier circuit, and used to sample the required DC high voltage of the rectifier circuit, and also send the sampling voltage to the decision circuit module; and an oscillating control circuit, linked to the decision circuit module and high-frequency oscillating circuit, used to receive the output of the decision circuit module, and control the operation of the high-frequency oscillating circuit.

The reference generator circuit comprises of an overvoltage protection circuit, an undervoltage protection circuit, a short circuit protection circuit, an overcurrent protection circuit and an overtemperature protection circuit connected in parallel; the overvoltage protection circuit is composed of the second and third resistors connected in series, and used to generate an overvoltage protection reference voltage; the undervoltage protection circuit is composed of the fourth and fifth resistors connected in series, and used to generate an undervoltage protection reference voltage; the short circuit protection circuit is composed of the sixth and seventh resistors connected in series, and used to generate a short circuit protection reference voltage; the overcurrent protection circuit is composed of the eighth and ninth resistors connected in series, and used to generate an overcurrent protection reference voltage; the overtemperature protection circuit is composed of the tenth and eleventh resistors connected in series, and used to generate an overtemperature protection reference voltage.

The first sampling circuit allows the thermistor and first resistor to be connected in series between the anode and cathode of the battery pack; the first sampling value obtained from the divider network of the first resistor varies with the thermistor; the second sampling circuit comprises a divider network of twelfth and thirteenth resistors connected in series; the second sampling value is obtained after sampling of the required DC high voltage by the divider network.

The second sampling circuit also comprises of a grounding terminal allowing for connection of the fourteenth resistor with DC motor in series; a third sampling value is generated on the fourteenth resistor when DC motor is in service.

The overvoltage protection reference voltage and the second sampling value are sent to the fifth decision circuit of the decision circuit module for comparison; the undervoltage protection reference voltage and the second sampling value are sent to the fourth decision circuit of the decision circuit module for comparison; the short circuit protection reference voltage and the third sampling value are sent to the third decision circuit of the decision circuit module for comparison; the overcurrent protection reference voltage and the third sampling value are sent to the second decision circuit of the decision circuit module for comparison; the overtemperature protection reference voltage and the first sampling value are sent to the first decision circuit of the decision circuit module for comparison.

The voltage-regulating module also comprises of voltage-stabilizing circuit, filtering circuit and surge absorbing circuit.

The battery pack includes at most 32 batteries.

The battery pack is divided into two groups, both of which are connected by a circuit breaker, so as to prevent damage of batteries arising from short circuit.

The battery pack generally includes 32 batteries, and every group includes 16 batteries, each of which is connected by a copper connector; the required DC high voltage is a 320V DC high voltage.

As compared with prior art, the power conversion system of HEV of the present invention employs an inverter power conversion module to boost the DC low voltage of the battery pack to a DC high voltage required for starting the vehicle; this could reduce the amount of LFP batteries while maintaining the power conversion effect; with the reduction of batteries for the battery pack, the cost and weight of the products can be diminished, while the connections of batteries and possible unreliable factors are cut down for more reliable connection and simpler processing; in addition, this could shorten the recharging time of batteries. It is found experimentally that, in the case of full load, the operating temperature of the present invention is only 40° C., and the conversion efficiency reaches 95%; moreover, with the help of the reference generator circuit, oscillating control circuit and sampling decision circuit, the present invention has the technical efficacies such as overvoltage protection, undervoltage protection, overtemperature protection, overload and short circuit protection.

DETAILED DESCRIPTION OF THE INVENTION

Figure 1:
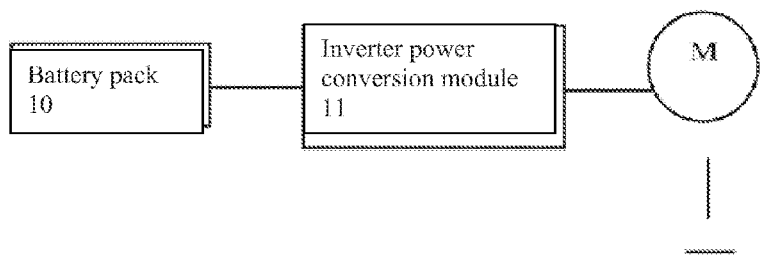
FIG. 1: an abridged frame diagram of power conversion system of HEV of the present invention.

FIG. 1 illustrates an abridged frame diagram of power conversion system of HEV of the present invention, wherein the power conversion system of HEV of the present invention comprises: and inverter power conversion module 11, of which the battery pack 10 includes some big-capacity batteries, e.g.: 1.5V LFP batteries not exceeding 32, mainly used to store electric energy and energize the motor of HEV when necessary; the inverter power conversion module 11 is connected with the battery pack 10, with its output end linked to the motor of HEV (i.e.: DC motor M in FIG. 1); the inverter power conversion module 11 is mainly used to convert DC voltage generated by the battery pack 10 into DC high voltage, namely, the inverter power conversion module 11 is powered by the battery pack 10, such that DC voltage generated by the battery pack 10 is converted into 320V DC high voltage to drive the motor of HEV.

Figure 2:
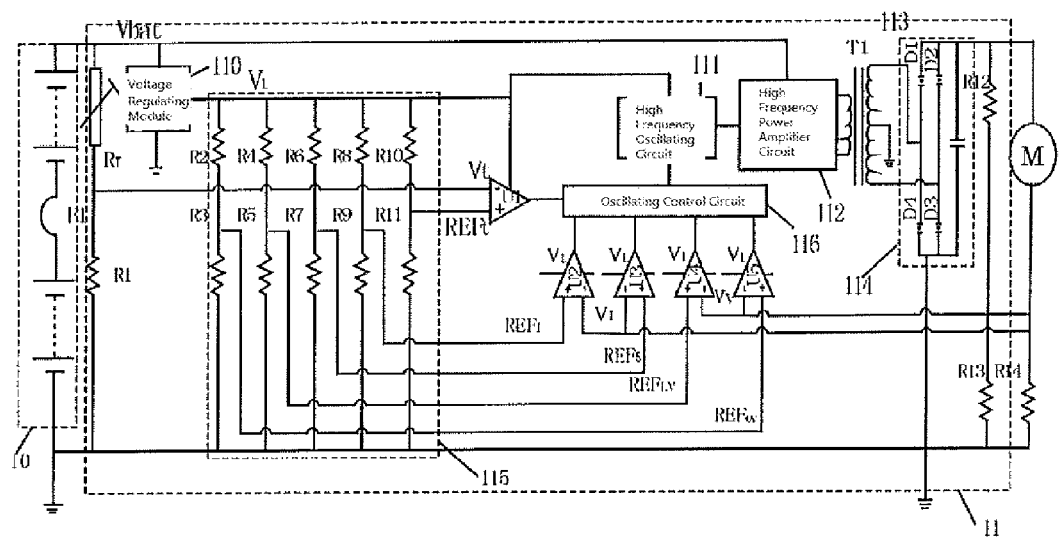
FIG. 2: a detailed circuit diagram of power conversion system of HEV of the present invention.

FIG. 2 illustrates a detailed circuit diagram of power conversion system of HEV of the present invention, wherein the inverter power conversion module 11 comprises at least: voltage-regulating module 110, high-frequency oscillating circuit 111, high-frequency power amplifier circuit 112, high-frequency transformer 113 and rectifier circuit 114.

The voltage-regulating module 110 is connected with the anode of the battery pack 10, and mainly used to regulate DC voltage Vbat generated by the battery pack 10, provide stable DC low voltage to various parts and filter strong disturbances from the generator and motor as far as possible; the voltage-regulating module 110 is composed of voltage-stabilizing circuit, filtering circuit and surge absorbing circuit, with its output VL of typical value 15V.

The high-frequency oscillating circuit 111 is used to generate 20 KHZ-1 MHZ high-frequency small signals required for the inverter power conversion module of the present invention; it is connected with the voltage-regulating module 110, which outputs DC low voltage VL; the output of high-frequency oscillating circuit 111 is sent to the high-frequency power amplifier circuit 112, where high-power high-frequency signals could accelerate the boosting of the high-frequency transformer 113; then high-power high-frequency signals from the high-frequency transformer 113 are sent to the rectifier circuit 114, which is a bridged rectifier circuit composed of four rectifier diodes, and bridged onto the high-frequency transformer 113; in detail, the bus node connected in series with the anode of rectifier diode D1 and the cathode of rectifier diode D4 is linked to the secondary end of the high-frequency transformer 113, whilst the bus node connected in series with the anode of rectifier diode D2 and cathode of rectifier diode D3 is linked to the other secondary end of the high-frequency transformer 113; after the boosted high-power high-frequency signals are rectified by the rectifier circuit 116, DC high voltage required by HEV is output; in the preferred embodiment of the present invention, the required DC high voltage is a 320V DC high voltage, which is sent to DC motor M to drive mechanically HEV.

Preferably, referring also to FIG. 2, the inverter power conversion module 11 for the power conversion system of HEV of the present invention also includes: reference generator circuit 115, oscillating control circuit 116 and sampling decision circuit, which have the functions of overvoltage protection, undervoltage protection, overtemperature protection, overload and short circuit protection.

The reference generator circuit 115 is used to generate reference voltage for the decision circuit module. It comprises of overvoltage protection circuit 1150, undervoltage protection circuit 1151, short circuit protection circuit 1152, overcurrent protection circuit 1153 and overtemperature protection circuit 1154 connected in parallel; it is also connected between the output end of the voltage-regulating module 110 and cathode of the battery pack 10. Of which, the overvoltage protection circuit 1150 is composed of second resistor R2 and third resistor R3 connected in series, and used to generate overvoltage protection reference voltage REF UV, which is sent to the fifth decision circuit U of the decision circuit module; the undervoltage protection circuit 1151 is composed of fourth resistor R4 and fifth resistor R5 connected in series, and used to generate undervoltage protection reference voltage REFLV, which is sent to the fourth decision circuit U4 of the decision circuit module; the short circuit protection circuit 1152 is composed of sixth resistor R6 and seventh resistor R7 connected in series, and used to generate short circuit protection reference voltage REFS, which is sent to the third decision circuit U3 of the decision circuit module; the overcurrent protection circuit 1153 is composed of eighth resistor R8 and ninth resistor R9 connected in series, and used to generate overcurrent protection reference voltage REF1, which is sent to the second decision circuit U2 of the decision circuit module; the overtemperature protection circuit 1154 is composed of tenth resistor R10 and eleventh resistor R11 connected in series, and used to generate overtemperature protection reference voltage REFt, which is sent to the first decision circuit U1 of the decision circuit module.

The sampling decision circuit is used for sampling of the batteries and the output conditions, and for comparison with the reference voltage. It comprises of the first sampling circuit, second sampling circuit and decision circuit module, of which the first sampling circuit (composed of the thermistor RT and the first resistor R1 connected in series) is connected between the anode and cathode of the battery pack 10; the thermistor RT and first resistor R1 are used to detect the temperature of the battery pack 10; the higher temperature of batteries could lead to rising resistance of RT; the first sampling value Vt for the sampling voltage of the divider network (composed of RT and first resistor R1) varies accordingly; the first sampling value Vt is sent to the first decision circuit U1 of the decision circuit module, and compared with the overtemperature protection reference voltage REFt; the thermistor RT shall be installed as close as possible to the battery pack of HEV, and not be warmed up by the heating parts such as oil-operated motor; it is linked to the output end of 320V DC high voltage of the inverter power conversion module 11 through the twelfth resistor R12 and thirteenth resistor R13 connected in series; the second sampling value VV is obtained after sampling of 320V DC high voltage output by the divider network. Then, the second sampling value VV is sent to the fourth decision circuit U4 and fifth decision circuit U5 of the decision circuit module, and also compared separately with overvoltage protection reference voltage REFOV and undervoltage protection reference voltage REFLV; a small resistor—the fourteenth resistor R14 is connected in series to the grounding terminal of DC motor M; a small voltage V1—the third sampling value, is generated on the fourteenth resistor R14 when. DC motor is in service. This small voltage is filtered and then sent to the second decision circuit U2 and third decision circuit U3 of the decision circuit module, and compared with overcurrent protection reference voltage REF1 and short circuit protection reference voltage REFS.

The oscillating control circuit 116 receives the output generated by the decision circuit module, and controls the operation of the oscillating circuit according to the received information, e.g.: highlighting the indicator or closing directly DC inverter circuit to protect the power conversion system of HEV of the present invention.

To ensure that the high-frequency oscillating circuit is in normal service at different situations, the high-frequency oscillating circuit 113 is also connected with the oscillating control circuit 112, powered by output voltage VL of the voltage-regulating module 110, and subject to the oscillating control circuit 116 for direct or delay control. Under the control of oscillating control circuit 116, high-frequency small signals output by the high-frequency oscillating circuit 111 are sent to the high-frequency power amplifier circuit 114 to generate high-power high-frequency signals and accelerate the boosting of the high-frequency transformer 115; the boosted high-power high-frequency signals are sent to the rectifier circuit 116, then 320V DC high voltage is output to DC motor M, which drives mechanically HEV.

In the preferred embodiment of the present invention, the battery pack 10 includes 32 1.5v LFP batteries, which are divided into two groups, each with 16 big-capacity batteries; the total voltage of the battery pack 10 is 48V; these two groups are connected by a circuit breaker F1, which could prevent damage of batteries arising from short circuit. The batteries of the battery pack 10 are connected by a copper connector, while the battery pack 10 and inverter power conversion module 11 are connected by a wire.

The power conversion system of HEV of the present invention employs an inverter power conversion module to boost DC low voltage of the battery pack to a DC high voltage required for the vehicle; this could reduce the amount of LFP batteries while maintaining the power conversion effect; with the sharp reduction of batteries for the battery pack, e.g.: decline from 100 to 32 or even 16, the cost can be saved up to 60%, while the connections of batteries and possible unreliable factors are cut down for more reliable connection and simpler processing (decline from 100 to 20 steps); it is found experimentally that, in the case of full load, the operating temperature of the present invention is only 40° C., and the conversion efficiency reaches 95%; moreover, with the help of the reference generator circuit, oscillating control circuit and sampling decision circuit, the present invention has the technical efficacies such as overvoltage protection, undervoltage protection, overtemperature protection, overload and short circuit protection.

Although the invention has been explained in relation to its preferred embodiment, it is to be understood that many other possible modifications and variations can be made without departing from the spirit and scope of the invention as hereinafter claimed.

The invention claimed is:

1. A power conversion installment kit for plug-in HEV, comprising at least:
   a battery pack, used to generate a DC voltage; and
   an inverter power conversion module, with its input end linked to the battery pack, and its output end linked to a DC motor of the HEV, used to convert the DC voltage into a DC high voltage; the required DC high voltage shall be capable of at least driving the DC motor wherein the inverter power conversion module includes at least: a voltage-regulating module, connected with an anode of the battery pack, and used to regulate the DC voltage for providing a stable DC low voltage;
   a high-frequency oscillating circuit, with a first end linked to the voltage-regulating module, and powered by the DC low voltage to output a high-frequency small signal, and a second end linked to a high-frequency power amplifier circuit; wherein the high-frequency power amplifier circuit is used to receive and to amplify the high-frequency small signal, and to generate a high-power high-frequency signal;
   a high-frequency transformer, used to receive the high-power high-frequency signal and boost to a high voltage;
   a rectifier circuit, bridged onto a secondary end of the high-frequency transformer, with its output end linked to the DC motor of the HEV; the rectifier circuit rectifies the high voltage and then outputs the required DC high voltage to drive the DC motor;
   wherein the rectifier circuit is a bridged rectifier circuit composed of four rectifier diodes;
   wherein the inverter power conversion module also including at least:
   a reference generator circuit, with a first end linked to the voltage-regulating module, and the second end linked to a cathode of the battery pack, helping to provide a reference voltage for a decision circuit module;

a sampling decision circuit, comprising of a first and a second sampling circuits and the decision circuit module; the first sampling circuit is connected between the anode and the cathode of the battery pack, allowing for sampling of the output voltage of the battery pack to acquire a first sampling value; and, the first sampling value is sent to the decision circuit module; the second sampling circuit is linked to the output end of the rectifier circuit, and used to sample the required DC high voltage of the rectifier circuit to acquire a sampling voltage, and also send the sampling voltage to the decision circuit module;

an oscillating control circuit, linked to the decision circuit module and the high-frequency oscillating circuit, used to receive the output of the decision circuit module, and to control the operation of the high-frequency oscillating circuit.

2. The power conversion installment kit for plug-in HEV as claimed in claim 1, wherein the reference generator circuit comprises of an overvoltage protection circuit, an undervoltage protection circuit, a short circuit protection circuit, an overcurrent protection circuit and an overtemperature protection circuit connected in parallel; the overvoltage protection circuit is composed of a second and a third resistors connected in series, and used to generate an overvoltage protection reference voltage; the undervoltage protection circuit is composed of a fourth and a fifth resistors connected in series, and used to generate an undervoltage protection reference voltage; the short circuit protection circuit is composed of a sixth and a seventh resistors connected in series, and used to generate a short circuit protection reference voltage; the overcurrent protection circuit is composed of a eighth and a ninth resistors connected in series, and used to generate an overcurrent protection reference voltage; the overtemperature protection circuit is composed of a tenth and an eleventh resistors connected in series, and used to generate an overtemperature protection reference voltage.

3. The power conversion installment kit for plug-in HEV as claimed in claim 2, wherein the first sampling circuit allows a thermistor and a first resistor to be connected in series between the anode and cathode of the battery pack; the first sampling value obtained from a divider network formed by the first resistor and the thermistor varies with the thermistor; the second sampling circuit comprises a divider network of a twelfth and a thirteenth resistors connected in series; the second sampling value is obtained after sampling of the required DC high voltage by the divider network.

4. The power conversion installment kit for plug-in HEV as claimed in claim 3, wherein the second sampling circuit also comprises of a grounding terminal allowing for connection of a fourteenth resistor with DC motor in series; a third sampling value is generated on the fourteenth resistor when DC motor is in service.

5. The power conversion installment kit for plug-in HEV as claimed in claim 4, wherein the overvoltage protection reference voltage and the second sampling value are sent to a fifth decision circuit of the decision circuit module for comparison; the undervoltage protection reference voltage and the second sampling value are sent to a fourth decision circuit of the decision circuit module for comparison; the short circuit protection reference voltage and the third sampling value are sent to a third decision circuit of the decision circuit module for comparison; the overcurrent protection reference voltage and the third sampling value are sent to a second decision circuit of the decision circuit module for comparison; the overtemperature protection reference voltage and the first sampling value are sent to a first decision circuit of the decision circuit module for comparison.

6. The power conversion installment kit for plug-in HEV as claimed in claim 5, wherein the voltage-regulating module also comprises of a voltage-stabilizing circuit, a filtering circuit and a surge absorbing circuit.

7. The power conversion installment kit for plug-in HEV as claimed in claim 6, wherein the battery pack includes at most 32 batteries.

8. The power conversion installment kit for plug-in HEV as claimed in claim 7, wherein the battery pack is divided into two groups, both of which are connected by a circuit breaker, so as to prevent damage of batteries arising from short circuit.

9. The power conversion installment kit for plug-in HEV as claimed in claim 8, wherein the battery pack generally includes 32 batteries, and every group includes 16 batteries, each of which is connected by a copper connector; the required DC high voltage is a 320V DC high voltage.

* * * * *